United States Patent
Green (10) Patent No.: US 6,830,597 B1
(45) Date of Patent: *Dec. 14, 2004

(54) PROCESS AND DEVICE FOR PYROLYSIS OF FEEDSTOCK

(75) Inventor: Alex E. S. Green, Gainesville, FL (US)

(73) Assignee: Green Liquids and Gas Technologies, Gainesville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/507,574

(22) Filed: Feb. 18, 2000

Related U.S. Application Data (63) Continuation-in-part of application No. PCT/US98/16957, filed on Aug. 14, 1998, which is a continuation-in-part of application No. 08/912,485, filed on Aug. 18, 1997, now Pat. No. 6,048,374.

(51) Int. Cl.$^7$ ................ C01J 3/00; B01J 8/00
(52) U.S. Cl. ............ 48/209; 48/62 R; 48/77; 48/89; 110/235; 110/346; 201/16; 201/25; 201/35; 202/90; 202/118; 422/202; 422/229
(58) Field of Search ............ 48/62 R, 77, 89, 48/209, 101, 111, 210; 110/346, 235, 208; 201/16, 35, 25, 40, 2.5, 30; 202/90, 118; 585/240; 422/202, 204, 198, 229, 211, 224

(56) References Cited

U.S. PATENT DOCUMENTS

| | | | |
|---|---|---|---|
| 3,320,152 A | * | 5/1967 | Nathan et al. ............... 208/410 |
| 4,123,332 A | | 10/1978 | Rotter ......................... 201/15 |
| 4,278,446 A | * | 7/1981 | Von Rosenberg et al. 48/197 R |
| 4,483,256 A | | 11/1984 | Brashear ...................... 110/210 |
| 4,578,176 A | * | 3/1986 | Tarman ........................ 208/409 |
| 5,059,404 A | * | 10/1991 | Mansour et al. ............. 423/201 |
| 5,226,927 A | | 7/1993 | Rundstrom .................... 48/76 |
| 5,266,086 A | | 11/1993 | Bailey et al. ................... 48/203 |
| 5,293,843 A | | 3/1994 | Provol et al. ................. 122/4 D |
| 5,354,345 A | * | 10/1994 | Nehls, Jr. ..................... 44/626 |
| 5,504,259 A | | 4/1996 | Diebold et al. ............... 568/697 |
| 5,618,321 A | | 4/1997 | Beierle et al. ................. 48/76 |
| 6,048,374 A | * | 4/2000 | Green ........................... 48/209 |

FOREIGN PATENT DOCUMENTS

| | | |
|---|---|---|
| EP | 0016585 | 10/1980 |
| EP | 0663433 | 7/1995 |
| FR | 0753783 | 10/1933 |
| FR | 2310531 | 3/1976 |
| GB | 100569 | of 1873 |
| WO | 96032163 | 10/1996 |

OTHER PUBLICATIONS

Green, Alex; Sergio Peres; James Mullin; Robert W. Anderson (1997) "Solid Fuel Gasification for Gas Turbines" Submitted for the Orlando, FL ASME–IGTI Gas Turbine Conference, Jun. 2–6, 1997, pp. 1–8.

Green, Alex and Sergio Peres, "Thermal Conversion of Biomass, A Strategic Analysis" In: University of Florida, Florida Cooperative Extension Service, EES 156, pp. 1–8.

\* cited by examiner

Primary Examiner—Hien Tran
Assistant Examiner—Jennifer A. Leung

(57) ABSTRACT

The subject invention pertains to unique and advantageous systems for gasifying and/or liquefying biomass. The systems of the subject invention utilize a unique design whereby heat from a combustion chamber is used to directly gasify or liquefy biomass. In a preferred embodiment, the biomass is moved through a reactor tube in which all the gasification and/or liquefaction takes place. Preferably, char exits the biomass reactor tube and enters the combustion chamber where the char serves as fuel for combustion. The combustion chamber partially surrounds the reactor tube and is in direct thermal contact with the reactor tube such that heat from the combustion chamber passes through the reactor wall and directly heats the biomass within the reactor tube.

12 Claims, 5 Drawing Sheets

PROCESS AND DEVICE FOR PYROLYSIS OF FEEDSTOCK

CROSS-REFERENCE TO A RELATED APPLICATION

This is a continuation-in-part of application Ser. No. PCT/US98/16957 filed Aug. 14, 1998, which is a continuation-in-part of application Ser. No. 08/912,485 filed Aug. 18, 1997, now U.S. Pat. No. 6,048,374.

BACKGROUND OF THE INVENTION

Combustion of biomass has been used by humankind to generate heat and light for about 500 millennia. Biomass was the world's predominant energy source until fossil fuels took over in the industrial world, during the industrial revolution. As a renewable energy source, biomass can now re-assume greater energy loads while serving a number of other economic, environmental, and social purposes. Biomass can include, for example, wood, wood waste, agricultural waste, energy crops, municipal solid waste, sewage sludge and cellulosic type industrial waste.

Biomass is made by photoreactions such as $$6CO_2 + 5H_2O \xrightarrow{sunlight} C_6H_{10}O_5 + 6O_2$$

leading to cellulosic type compounds such as $C_6H_{10}O_5$. Biomass fuel is greenhouse neutral since when burned it simply releases carbon dioxide and water that it took out of the atmosphere when it grew.

The conversion of heat to mechanical work can be accomplished via hot air engines, steam engines or internal combustion engines (ICE). Hot air and steam can be made by the direct combustion of biomass. However, for use with reciprocating or turbine ICEs, which have been dominant in the 20$^{th}$ century, biomass is best converted to liquid or gaseous fuels.

Gasification is a thermal process of changing a solid fuel such as coal, biomass or municipal solid waste into combustible gas and oil vapors. Four conventional biomass gasifier types that have evolved over many years are the fixed-bed updraft gasifier, the fixed bed downdraft gasifier, the moving bed gasifier, and the fluidized bed gasifier. Each type has advantages which are dependent upon the operating conditions, the output power required, and various other factors.

These conventional gasifiers typically create the heat for gasification by burning fuel in the gasification chamber itself. This can involve injecting air with its nitrogen into the gasification chamber, which dilutes the output gas with inert nitrogen as well as the products of combustion, including $CO_2$ and $H_2O$. The fuel being burned to generate the heat for gasification is typically burned without sufficient oxygen, thus creating the fuel gas carbon monoxide.

In A new class of gasifiers, referred to as indirectly heated gasifiers (IHGs), can generate at least a portion of the heat of gasification by combustion carried out in a separate chamber from the gasifier reactor. Accordingly, these IHGs reduce dilution of the output gas with nitrogen, carbon dioxide and water vapor. For example, one such gasifier heats sand in a separate combustion chamber and then transfers the hot sand into the gasification chamber to provide the heat for gasification. However, this process of heating and transferring sand is complicated and applies mainly to large gasification systems.

Depending upon the gasification agent and the gasifier, typical biomass gasifiers produce combustible CO, $H_2$, $CH_4$, and other light hydrocarbons, diluted with non-combustibles $N_2$, $CO_2$ and $H_2O$ vapor. The heat of combustion of the product gas is determined by the biomass feedstock and gasification agent used, as well as by the operational conditions, such as pressure, temperature, residence time and heat loss or external heat input.

The types of gases produced by biomass gasification can be divided into three categories according to their heat value (HV). Low heating value (LHV) gas (~6 kJ/liter) is produced by traditional gasifiers when air is used as the gasifier agent. The gas is used on site since storage and/or transportation of LHV gas are not economically favorable. Medium heating value (MHV) gas (~13 kJ/liter) can be produced with traditional gasifiers when oxygen is used as the gasifier agent since dilution by nitrogen is avoided. Medium HV gas can be used as fuel for internal combustion engines and gas turbines. In addition, medium HV gas can also be produced with IHGs in which the combustion chamber and the gasification chamber are separated. In IHGs the gasification process takes place without external oxygen (or nitrogen) and the output gas consists mostly of carbon monoxide with varying concentrations of the fuels hydrogen, methane, ethylene, ethane and other hydrocarbons, as well as some non-fuels such as carbon dioxide and water vapor. Medium HV gas can be used for the production of synthetic fuels, such as $H_2$, gasoline, methanol, synthetic natural gas, etc. High HV gas (~37 kJ/liter) is usually produced from medium HV gases. These gases can be used as substitutes for natural gas which usually has a heating value of about 50 kJ/liter.

Gas turbines (GT) have shown promise as an efficient means of transforming heat into mechanical work and are now serving as major components of large new electricity generation systems using natural gas. For example, a low cost solid fuel (SF) cogasifier fed by low cost local feedstocks can be coupled with smaller GT systems adapted for medium HV gas to produce electricity in, for example, remote regions where availability of electricity is limited. The cogasification of biomass with other domestic fuels can provide a long term strategy for effective utilization of biomass. For example, the blending of oxygenated fuels such as biomass with carbonaceous fuels such as coals, coke, and chars in a small cogeneration system can have technological, economic, and environmental advantages. In addition, interest in distributed electricity generation is creating a need for low cost gasifiers.

Even with a low cost gasifier, a gasifier-microturbine generator (GMTG) might have difficulty these days competing economically with simpler natural gas microturbine generating systems in many locations because of the current low price of natural gas in the United States. However GMTGs could be economically competitive if they could also serve secondary and tertiary added value functions. The standby production of liquid fuels and chemicals from biomass is an example of a useful secondary function that could help in amortizing the capital cost of a new gasifier. Another societal function that could be served in the longer term by an IHG biomass gasifier is the gasification or liquefaction of the organic matter in metal ladened biomass with the concentration of toxic metals is the char ash. Examples of this need arise in the disposal of plants used in phytoremediation of toxic sites or the disposal of copper chromium arsenate (CCA) treated wood that has exceeded its lifespan. Additional functions, such as the use of the microturbine exhaust output for generating process steam or heat for drying crops or biomass fuel, would further enhance the economic value of the GMTG system.

BRIEF SUMMARY OF THE INVENTION

The subject invention pertains to unique and advantageous systems for gasifying and/or liquefying biomass. The systems of the subject invention utilize a unique design whereby heat from a combustion chamber or other source is used to directly gasify or liquify biomass. In a preferred embodiment, the biomass is moved through a reactor tube in which gasification and/or liquefaction, i.e. the production of gases which condense at ordinary temperatures, takes place. In a specific embodiment, char is extruded from the biomass reactor tube and enters a combustion chamber where the char serves as fuel for combustion. The combustion chamber partially surrounds the reactor tube and is in direct thermal contact with the reactor tube such that heat from the combustion chamber passes through the reactor wall and directly heats the biomass within the reactor tube. Other heat sources which can be utilized to provide the heat for gasification and/or liquefaction include, but are not limited to, electric oven, coal, heavy oil, tire crumb, electric tube furnace, microwave, and nuclear.

In a specific embodiment the subject invention provides methods and apparatus for power generation utilizing a indirectly heated gasifier of the subject invention to provide fuel for small gas turbine generators. Thus, the system of the subject invention can be used for the gasification of solid fuel for small gas turbines.

The subject invention is also capable of serving secondary and tertiary added value functions such as standby liquefaction of biomass or concentration of toxic metals in biomass into a residual char that represents a small percentage of the original biomass. The small percentage may be, for example, about 5% or less. The system of the subject invention can be operated in a variety of modes with a variety of feedstocks including non-biomass fuels such as coal, tire crumb, plastic chips, refuse derived fuel (RDF), and other organic matter.

An advantageous feature of the subject invention is its simple indirect heating of the solid fuel which is to be gasified. The subject invention can utilize a simple, continuously fed, high temperature reactor based upon advanced materials and coatings such as those developed for advanced gas turbines. Advantageously, the heat generated during the combustion stage of the power generation process can be conducted through the internal structure of the gasifier to heat the biomass which is introduced into the gasifier. There can exist a temperature gradient whereby the biomass is exposed to progressively higher temperatures as it moves through the gasifier and is heated to high temperatures for gasification and/or liquefaction.

In a specific embodiment of the subject invention biomass is conveyed through the system by at least one auger which rotates in such a way as to move the biomass from an inner hopper through the gasifier. Depending on output needs, multiple auger-reactors can be utilized. As the biomass gasifies, the gases can rise up through the biomass being moved by the auger blade such that the biomass can act as a filter for the output gases. In an alternative embodiment, the auger shaft can be hollow and comprise openings to the biomass so as to provide a means for gases and/or liquefaction particles produced from the gasification and/or liquefaction process to travel out through the hollow auger shaft, thereby bypassing the filtering action of the input feedstock.

A further aspect of the subject invention involves proper blending of fuels to insure proper hydrogen/carbon (H/C) and oxygen/carbon (O/C) ratios such that steam or other hydrogenating agents are not necessary.

A further aspect of the subject invention is a method and apparatus for operating to produce, for example, oil and/or liquids.

A further aspect of the subject invention is provisions for burning extruded char-ash-tar (CAT), or extruded char-ash (CA) when tar is fully gasified, with air to provide heat for the overall gasification or liquefaction processes.

A further aspect of the subject invention is the application of anaerobic indirectly heated gasifiers to the concentration of metals and other toxic substances in the char-ash. In this particular embodiment the char-ash burning step is by-passed and part of the derived gas and, when necessary, external fuel, electrical heater, or other heat source are used to provide the heat for the gasification or liquefaction processes.

A further aspect of the subject invention is a provision for adapting to a char-ash capture and metal recovery mode, for example when the biomass contains contaminants.

A further aspect of the subject invention is a provision for adaptation to an ash encapsulation mode.

Other objects, advantages, and features of the subject invention will be apparent from the following description of the preferred embodiment taken in conjunction with the accompanying drawings.

DETAILED DISCLOSURE OF THE INVENTION

The subject invention pertains to unique and advantageous systems for gasifying and/or liquefying biomass. The systems of the subject invention utilize a unique design whereby heat from a combustion chamber or other heat source is used to directly gasify or liquefy biomass. In a preferred embodiment, the biomass is moved through a reactor tube in which all the gasification and/or liquefaction takes place. In a specific embodiment, char exits the biomass reactor tube and enters the combustion chamber where the char serves as fuel for combustion. The combustion chamber or other heat source can partially surround the reactor tube and can be in direct thermal contact with the reactor tube such that heat from the combustion chamber or other heat source passes through the reactor wall and directly heats the biomass within the reactor tube. Other heat sources which can be utilized to provide the heat for gasification and/or liquefaction include, but are not limited to, electric ovens, coal, heavy oil, tire crumb, electric tube furnace, microwave, and nuclear. The term "gasification" as used herein refers to, in general, the production of hot gases that do not condense at ordinary environmental temperatures and pressures. The term "liquefaction" as used herein refers to, in general, the production of hot gases that condense to liquids under ordinary environment temperatures and pressures. In accordance with the subject invention, gasification and liquefaction can occur simultaneously. The term "pyrolysis" as used herein refers to, in general, gasification and/or liquefaction.

A specific embodiment the subject invention provides methods and apparatuses for power generation utilizing an indirectly heated gasifier for small gas turbine generators. The subject invention can be used in solid fuel gasification for small gas turbines. The subject invention can also be utilized by providing multiple systems for medium size turbines.

Figure 1:
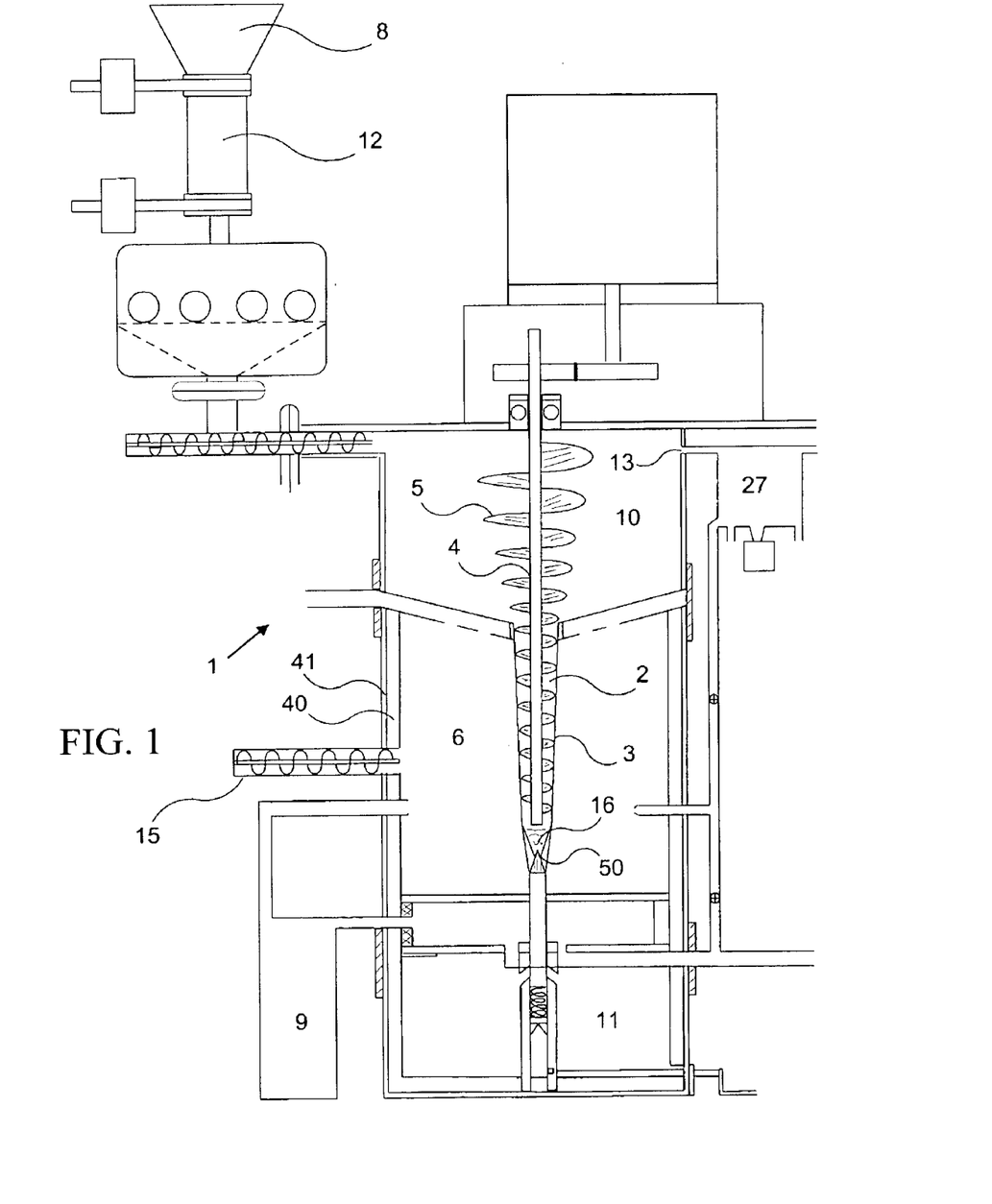
FIG. 1 illustrates a cross-section of a solid fuel, indirectly heated, gasifier according to the subject invention.

FIG. 1 illustrates a compact gasifier 1 which can produce, for example, a medium HV gas with an output capable of running a microturbine generator. The subject gasifier can utilize a variety of blended feedstocks, for example, wood chips, newspaper, mixed waste paper, peat, energy crops, agricultural residues as well as coal, tire crumb, plastics, RDF, lignite coal, lignin, bark, and other organic material. The output of a single or multiple module gasifier according to the subject invention can be sufficient to power a small gas turbine generator, for example as a part of a distributed electrical system. For example, a plurality of reactor tubes can be utilized to increase the throughput of feedstock. In a specific embodiment, six reactor tubes and six corresponding rotating augers can be utilized to increase the throughput of feedstock. The subject invention can take advantage of high temperature materials and coatings of the nature of those used for advanced gas turbines. Further, the subject gasifier can deliver medium HV gaseous fuels, for example free of ash, char, and tars, to a small gas turbine-generator. These small gas turbines can produce, for example, about 10 to 250 kW, as compared to gas turbine generators in the megawatt or multi-megawatt range.

An important feature of the subject invention is a means for feeding the material from the inner hopper 10 into the reactor tube 2. For example, a uniform or tapered auger 4 can be utilized. The auger 4 and reactor tube 2 should be able to withstand high temperatures. Metallic materials such as Haynes 214 or 230 alloys or high temperature Inco or Rolled alloys can be used such that the subject gasifier can accomplish high yield gasification or liquefaction in a single stage. Alternatively the reactor tube can be made out of advanced ceramics or composites. The higher temperatures not only foster rapid and complete volatilization, but also promote the chemical reactions with the char, largely carbon (C):

$$H_2O + C \rightarrow H_2 + CO, \quad CO_2 + C \rightarrow 2CO$$

Advantageously, these chemical reactions increase the heating value of the gaseous output, further increase volatile generation, and decrease char residue.

In a specific embodiment, the subject gasifier involves the feeding of biomass into inner hopper 10 such that a rotating auger flight 5 can force the biomass into reactor tube 2. While residing in the inner hopper, the biomass can be heated by exposure to the bottom cone of the inner hopper and the gases emanating from the reactor tube 2. Once in the reactor tube 2, the biomass can be further and more rapidly heated by heat produced by, for example, a flame in the combustion chamber 6 which is conducted through the reactor tube walls 3. This heat conducted through the reactor tube walls 3 causes gasification of the biomass as the biomass is moved through the reactor tube 2 by the rotating auger flight 5. The gases given off during gasification can travel through the biomass in reactor tube 2 toward the inner hopper 10, so as to be filtered by the incoming feedstock, and subsequently outputted via, for example, an output gas opening 13. Once the biomass reaches the end of the reactor tube 2, it becomes a char-ash-tar (CAT) with the amount of the tar component depending upon feed rate, temperature of operation, input feedstock, and other variables.

The subject invention can provide a combustion chamber 6 for burning the extruded char-tar with air to provide at least a portion, and preferably all, of the heat and corresponding high temperatures needed for the gasification or liquefaction process within the reactor tube 2. The heat from the combustion chamber 6 conducts through the wall 3 of the reactor tube 2 and can be transferred to the feedstock by contact of the feedstock with the reactor tube 2. A temperature gradient can be established, for example in steady state, which provides higher temperatures as the biomass heats up as it moves along the reactor tube and is subsequently transformed into the char-ash-tar plug 16. At the end of the reactor tube, the char-ash-tar can be pushed out of outlet 50 and enter the combustion chamber 6. Once in the combustion chamber 6, air, for example preheated, can be provided by blower 9, and the char or char-ash-tar can be burned to create heat that is then conducted through the reactor tube walls to gasify the biomass. The air can be preheated by, for example, the combustion chamber's exhaust gases using a heat exchanger.

Advantageously, the subject invention can utilize this indirect heating of feedstock for oxygen-free volatilization of the feedstock. The outer surface 40 and 41 of the gasifier 1 can be made of combinations of materials which insulate the internal chambers of the gasifier from the outside. This keeps the heat, which is used to heat the biomass, in the gasifier and reduces the heat in the surrounding environment. The reactor tube 2, preferably tapered, can be made from materials and coatings which allow heat from combustion chamber 6 to conduct through to the biomass. In order to allow for gasification of the biomass, the materials used for the reactor tube walls, the auger, and the auger blade should, preferably, be able to withstand high temperatures. Higher gasification temperatures can increase gas yield. In a preferred embodiment, the gasification temperature exceeds about 800° C. (1472° F.) and most preferably is about 1000° C. (1822° F.) to about 1200° C. (2191° F.). Preferably, production of condensable gases, i.e. liquefaction, can occur within a temperature range of about 400° C. (752° F.) and about 800° C. (1472° F.), and most preferably within the range of about 500° C. (932° F.) and about 600° C. (1112° F.).

The gasification and/or liquefaction of the biomass can create pressure in the reactor tube 2 and inner hopper 10. This pressure can range greatly depending on the exit flow rate of the gasifier. For example, the pressure in the inner hopper can be maintained as low as about 1 psi gauge. In another specific embodiment, pressures on the order of about 100 psi can be generated in the reactor tube 2 and maintained in the inner hopper 10. A means for the pyrolysis-gasification gas output to exit upward through the incoming feedstock allows the feedstock to serve as a filter, capturing tar comprising condensable complex organics which can then make an additional pass through the high temperature reactor to be broken down into smaller molecules. It is important to provide a means for preventing the gasification gases from exiting the reactor tube into the combustion chamber 6, wherein the combustion chamber 6 is preferably at a lower pressure. The CAT plug 16 at the outlet of the auger-reactor can provide a means for keeping gases from the reactor tube 2 from leaking into the combustion chamber 6. Accordingly, the CAT plug 16 insures that the gases generated in the auger-reactor work up through the incoming feedstock to the inner hopper. Advantageously, condensable gases, tars, liquids, and particles captured by the incoming feedstock make additional passes through the reactor tube, allowing these bigger molecules to be broken down into lighter gases.

It is important that the heat conducted from the combustion chamber through the reactor tube walls 2 be able to reach and, therefore heat, the biomass in the reactor tube. Depending on the type of biomass and other parameters, the reactor tube can be, for example, on the order of one to several inches in diameter in order to allow sufficient heating of the biomass. In a preferred embodiment, the diameter of the reactor tube is between about 1 and about 5 inches. Materials and coatings currently used in advanced gas turbines can be used in the subject gasifier, particularly in critical components such as the reactor tube.

In a preferred embodiment, the subject gasification method involves blending fuels in such a way as to insure proper H/C and O/C ratios, thus rendering steam or another hydrogenating agent unnecessary. Blending of feedstocks in accordance with the subject invention also gives acceptable char-ash-tar residue properties to form a CAT plug 16 capable of withstanding pressures in the reactor tube 2 and inner hopper 10 of approximately 1–100 psi. In addition, the blending is adjusted to achieve a net heating value input and sufficient char-tar output to provide the heat required for endothermic gasification processes. This blending can occur in, for example, the outer hopper 8. In a specific embodiment, the system of the subject invention comprises a means for taking chipped feedstock from an outer hopper 8 at atmospheric pressure to an inner hopper 10 at gas pressures up to about 100 psi. For example, a lock hopper 12 can be utilized to input feedstock to the gasifier. Alternatively, other high pressure solid feeders such as rotary valves as in the recently developed Stamet POSIMETRIC system can be adapted for this application.

Figure 3:
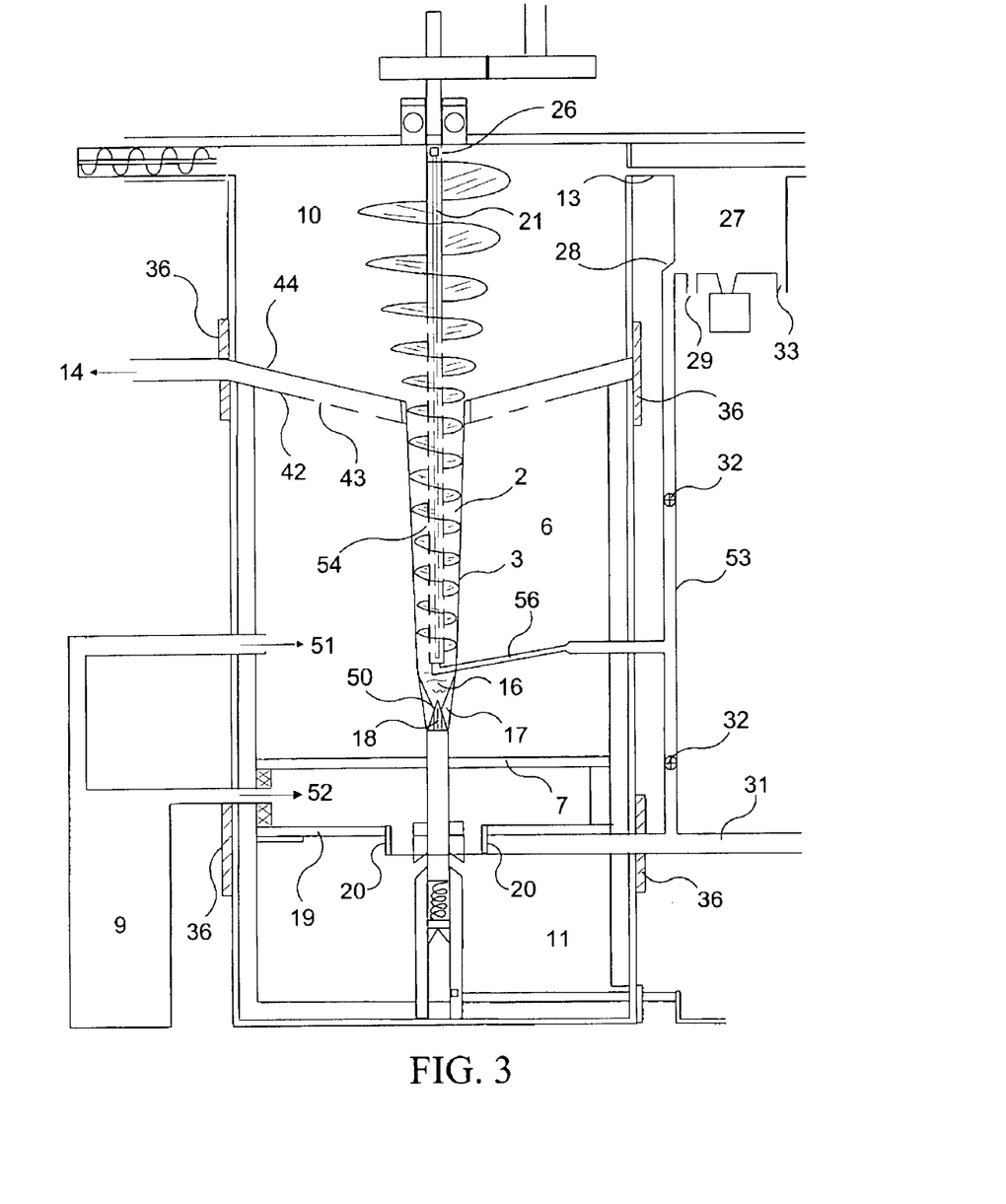
FIG. 3 illustrates a cross-section of a gasifier in accordance with the subject invention, adapted to enhance production of oil and/or liquids.

Referring to FIG. 3, in preferred embodiment, the outlet 50 at the bottom of the reactor tube 2 is shaped such at the CAT forms a plug 16 capable of withstanding differential pressures up to about 100 psi or more. This plug 16 insures that the product gas goes toward the inner hopper 10 and the combustion gases go out, for example, the combustor exhaust 14. In a specific embodiment, the combustion exhaust can proceed through opening 43 in a flame guard plenun 42, where the exhaust can heat the funnel wall 44 carrying feedstock to the auger-reactor. This can begin the process of raising the feedstock to high temperatures and, in addition, extract heat from the combustion exhaust gases. Further extraction of the heat of the combustion exhaust gases can be accomplished by heating the incoming air 51, 52 using a h at exchanger.

At outlet 50 of orifice 17, additional plugging means, for example an adjustable or spring loaded cone-like plug 18, an be used to plug orifice 17, for example at start up, and can be opened by the extrusion pressure when an adequate CAT plug 16 is formed. The plug 18 can also prevent output gases from leaking into the combustion chamber 6 and prevent combustion gases from leaking up into the reactor tube. This plug 18 can, for example, be operated by or maintained by spring loading 23 (see FIG. 4). In these ways the outlet 50 can be adjustable, to optimize the CAT extrusion to serve as a plug for any feedstock.

As the CAT plug 16 is extruded out of outlet 50, the char falls onto, for example, grate 7. Blower 9 can blow heated air, into the combustion chamber 6 to provide over-fire tangential or incoming air 51 for combustion of the char, and under grate 7 to provide under-fire air 52 for combustion of the char. In a specific embodiment, the exhaust gases from 14 can be used with a simple heat exchanger to preheat the air entering the combustion chamber. Once the char is burned, the ashes can fall through grate 7 and spider 19 into ash receptacle 11. A start-up gas burner 20 (e.g., propane) can be utilized for initial heating of the reactor tube and can be located, for example, integrally with spider 19.

In a specific embodiment, a burning means, for example comprised of pipes 53 and valves 32, can be used for burning some of the product gas through burner 55 (see FIG. 4, 5) in the combustion chamber 6 to provide heat for Gasification. In addition, an external source of gaseous fuel can be provided through input 31 for the combustion chamber when, for example, the feedstock has insufficient heating value, the feedstock is wet, or when the char ash is to be collected because of toxic content.

Figure 5:
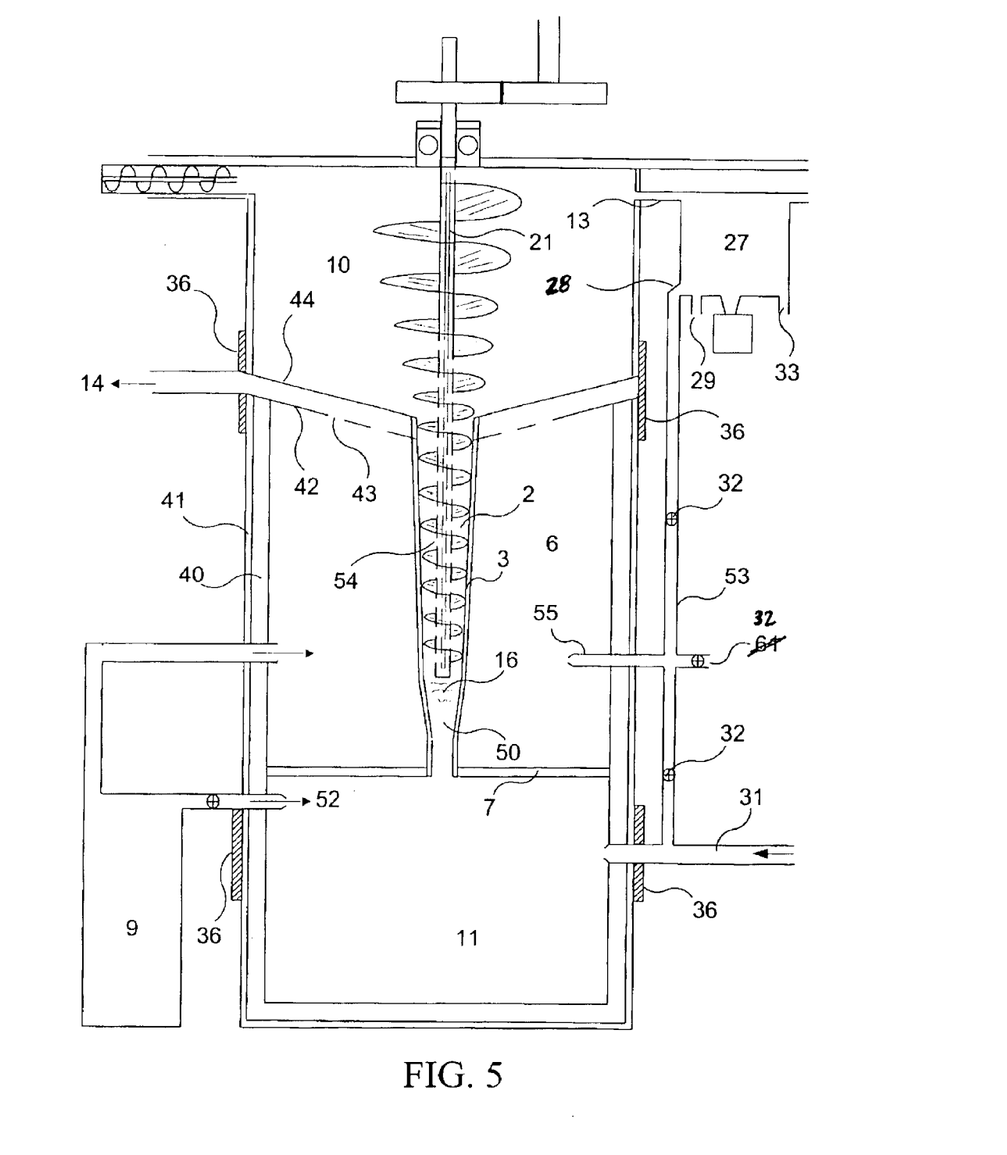
FIG. 5 illustrates a cross-section of gasifier in accordance with the subject invention, incorporating a pressure vessel char-ash collector.

In an alternate embodiment, as shown in FIG. 5, grate 7 is replaced by a solid plate so that chamber 11 becomes a simple pressure vessel char-ash collector. In this embodiment, upon entering the high temperature zone the feedstock, in the absence of oxygen, begins to pyrolyze, forming gases, liquids (tars), and a solid residue (char/ash). As the feedstock reacts, the solid extrudes out the bottom into the char collector or chamber 11. The gases and vapors that are generated flow upwards, through the reactor and the incoming feedstock in the hopper, where some of the condensable gases (tars) are removed and some pass through, depending upon the feedstock height in the hopper. The output of the gasifier is passed into separator 27 that can perform various function depending upon the mode of operation of the microgasifier. In the gas production mode the separator primarily separates particles from the gas stream that have not already been filtered out by the incoming feedstock. In this mode molecular sieves can be used to separate molecular hydrogen from the remaining gases which can exit through orifice 29 into a compressor for storage and premium fuel use. These molecular sieves may be, for example, zeolite or ceramic.

In the liquid production mode, i.e., the production of condensable gases, separator 27 provides a water-cooled condensing system or a refrigerator cooled system to condense the oils and liquids, including water, arising from lower temperature pyrolysis of the incoming feedstock. These liquids can exit through orifice 33 and be collected during low gas needs of the microgasifier. Occasionally, these liquids can be distilled on site or be sent, for example, to a local distiller for separation into premium liquid fuels or chemicals. In the pressure vessel receptacle mode gases, such as steam, carbon dioxide, or natural gas, can be injected through input 31 to enhance carbon conversion in the reactor via the reactions $H_2O+C \rightarrow H_2+CO$, $CO_2+C \rightarrow 2CO$ or $C+CH_4 \rightarrow C_2H_4$.

The subject methodology can be used to capture metals chemically or by being physically bound in the solid feedstocks. This can be useful with respect to waste disposal problems and can provide a basis for developing and using IHG/L technology even when, in the absence of this service, it is not economically competitive in power generation. Such needs can include a). the capture of lead, mercury, arsenic or other toxic metals found in construction and demolition debris (C&DD), b). the disposal of old CCA treated wood, c). the disposal of plants grown on mined phosphate lands, d). the disposal of plants used for phytoremediation, e). the concentration of the metals picked up by plants used for phytomining, f). the "de-alkalization" (removal of potassium and/or sodium) of plant matter to produce gas for co-firing biomass derived fuel in coal boilers so as to avoid slagging and fouling problems.

For materials laden with highly refractory metals, pyrolysis at temperatures below the boiling point should leave most of the metals in the char-ash. Steam, carbon dioxide, air oxygen, or natural gas injected at the bottom of the reactor tube or through holes in the auger pipe-shaft can at high temperatures convert char and tar into useful gases or liquids. For materials such as CCATW, with its semi-volatile metal arsenic, the post gasification system can bear at least part of the clean-up burden. For example, the gas output from pyrolysis can be scrubbed by one or more of a variety of techniques known in the art to remove volatile metals such as arsenic. Cleaning the gas or liquid before using it for fuel has a major advantage over a post combustion clean-up system. A post combustion system needs to process some 5 or so times the weight or volume of gas that such a pre-combustion system would process. Furthermore, if applied to an IHG output, the sensible heat that must be taken out of the precombustion gas is small compared to the heat content of the gas. This is not the case if one scrubs the gas from an air blown gasifier that generates a much lower heating value gas. Accordingly, with medium heat value gases heat losses can be tolerated better than when scrubbing low heating value gases from air blown gasifiers and from combustion stack gases.

For feedstocks laden entirely with volatile metals the gas clean up system should bear most of the clean-up burden. Here, very high temperature processing can insure fast and thorough volatile metal purging of the solid fuel. Good heat recovery is preferred so that not too much sensible heat is wasted. A IHG in accordance with the subject invention can provide useful advantages in that the output gas can give up most of its heat to the incoming feedstock, serving the double function of cooling and filtering the gas to an extent controllable by adjusting the level of feed in the inner hopper.

One of the earliest motivations for working on coutilization of domestic fuels was the possibility that there would be advantageous synergies that could be exploited to help in oil displacement. Biomass can be used to assist the processing of coal in the subject IHG/L to achieve conditions that can remove and capture arsenic, mercury or other volatile metals from the coal. Biomass blends with lignite coal that is closest from an H/C, O/C standpoint to lignin or bark can be used. The purged lignite can be used to fuel the process, although some carbon can remain in the ash. Steam can be used to hydrogenate the carbon to take advantage of the reaction:

$$C+H_2O \rightarrow CO+H_2$$

Temperatures which can overcome the activation barrier can be used, leading to the possible hydrogenation reaction $$CH_4+C \rightarrow C_2H_4$$

This reaction can use natural gas (mainly $CH_4$), another fossil fuel, to convert solid carbonaceous coal into a high energy gaseous form suitable for turbines. The ethylene can be used as feedstock for polyethylene production.

Dual service carbon sequestering schemes can also be utilized. For example, $CO_2$ can be used as an oxidizer with lignite coal as feedstock. For example, consider the reaction $$C_6H_5O+CO_2+C_7H_5O_3 \rightarrow CO+C_6H_5O_2$$

Here $C_6H_5O$ is a surrogate for lignite coal and $C_6H_5O_2$ or $C_7H_5O_3$ is a surrogate for lenoardite or humic acid that has a high value as a soil amendment. This reaction can go rapidly at high temperatures. If desired, a catalyst can be used to promote it. In addition to consuming $CO_2$, the reaction can produce valuable products, such as leonardite and/or humic acid. Advantageously, coal itself can be used as the scrubber, addressing the $CO_2$ problem while producing useful products with good market value.

Figure 2:
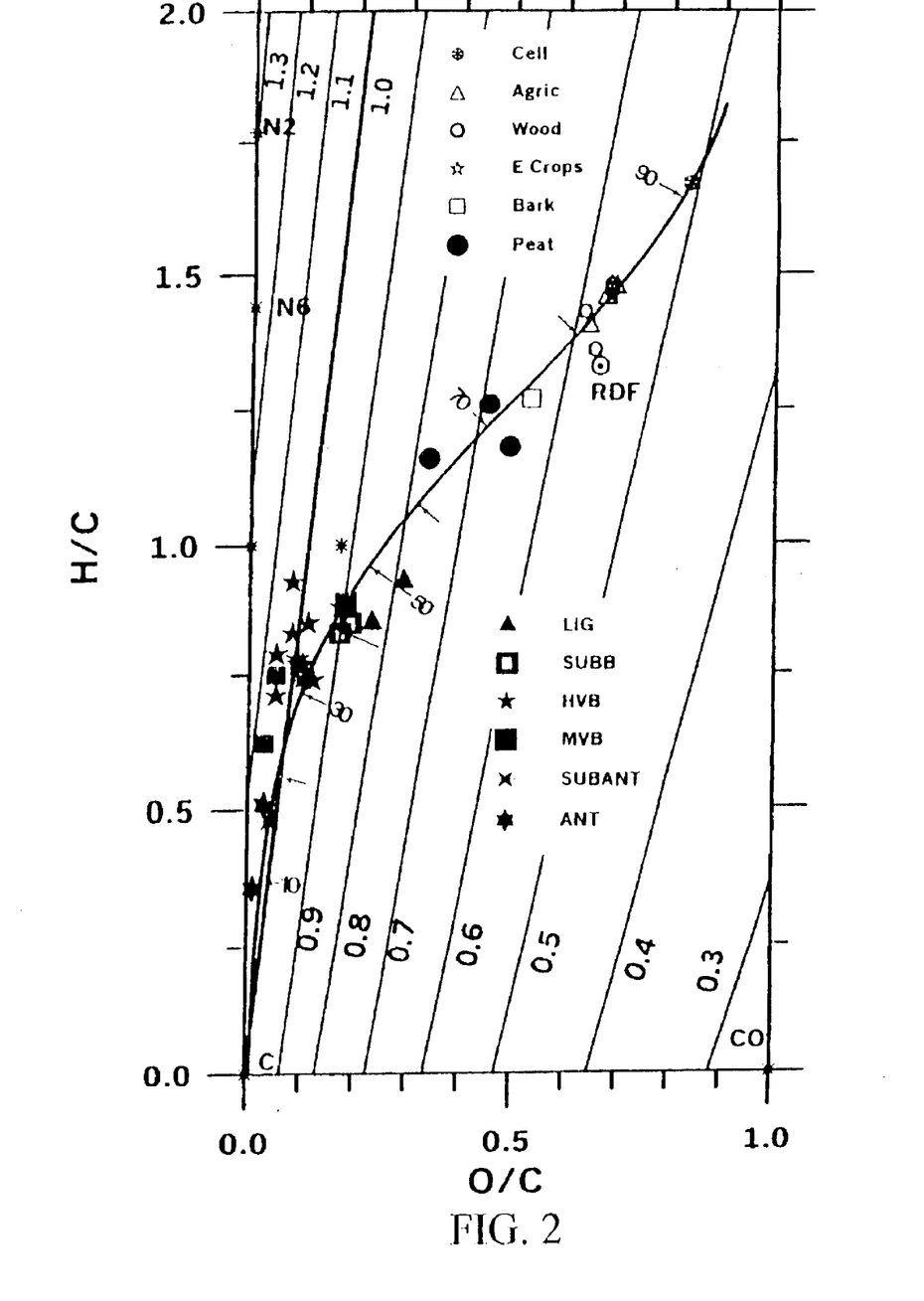
FIG. 2 is a composite drawing illustrating important properties of various feedstocks.

A means for adjusting feed rate to meet the desired gas power output can also be provided. The feed rate for a desired output can be estimated, for example when firing with dry biomass. FIG. 2 is a composite diagram giving the H/C and O/C atomic ratios of various potential solid feedstocks. Also shown in FIG. 2 are the heating values relative to carbon (32 kJ/g) and the volatile percentage assigned by ASTM weight loss method. An empirical rule that 1 gram of biomass at about 1000° C. typically produces about 0.75 liters gas with a heating value of approximately 15 kilojoules/liter can be used. Accordingly, one gram gives about 11 kilojoules gas energy. Hence, one gram/sec is capable of producing 11 kilowatts gas heating power. Assuming a 30% capability of converting gas fuel to electrical energy, which may be considered typical, gives 3.3 kW. Accordingly, a feed rate of one gram/sec corresponds to 3600 gram/hr or 3.6 kg/hr=3.6×2.2 (lb/kg)=7.9 lb/hr=3.3 kWe. Therefore a rule of thumb is=7.9/3.3 =2.4 lb/hr biomass gives 1 kWe, for typical dry biomass. This corresponds to a heat rate of about 17M BTU/kW which is comparable with the heat rates of large but older coal or oil utilities. This heat rate can be further improved by optimizing the fuel blend utilized and/or the operational variables of the system.

Note that since the biomass heat value (HV) per gram is about 0.6×32 kJ=19 kJ whereas the HV of the gas produced is about 15 kJ, about 4 kJ are expended in the gasification process. If 20% of the initial feedstock produces a char-tar that has a HV of about 30 kJ/g the heat value of about 6 kJ is available for each gram of feedstock. This is more than enough char-tar to provide the energy required for gasification.

The corresponding calculation for other feedstocks can be carried out in an analogous way. For any feedstock, the solid fuel heating value per gram must be greater than the heating value of the gas generated per gram and must produce a char tar residue which when combusted will provide the endothermic energy needed for gasification. As referred to above, blending of available fuels may be conducted as described herein to achieve optimal performance for a given application. When blending fuels, attention must be paid to the physical and textural properties of the constituents to insure the filtering action of the input feedstock and the plugging effectiveness of the char-tar-ash extrusion.

In a specific embodiment of the subject invention, if single auger throughput is not sufficient, a multiple auger reactor system driven by, for example, a single variable speed motor and comprising a single inner hopper and a single combustion chamber can be implemented.

The basic microgasifier of the subject invention can be adapted to produce, for example, oil and/or liquids. Referring to FIG. 3, an inner tube 21 can be provided, for example, with apertures 54 that can be opened or closed, for example by rotating inner tube 21 up to or through 90, to provide paths for the pyrolysis and gasification gases to go directly out of the auger reactor region to the top of the inner hopper 10. These gases can exit the inner tube through aperture 26 and subsequently through output gas opening 13. An external demister and water cooled condenser can be provided in the separator 27 to cool the condensable gases in order to extract oils and/or liquids. The non-condensable gases can be burned in the combustion chamber through outlet 28 and valve 32 with burner 55 (see FIG. 4, 5). Alternatively, through high temperature plumbing 56, part of these non-condensable gases can be pumped through the inner tube to speed the transport of the condensable gases to the condenser separator 27. Additionally, a means for adjusting excess air and tangential swirl can be used in the combustion chamber in order to lower the temperature in the combustion chamber and, therefore, lower the temperature acting on the reactor tube. In a specific embodiment, further reduction of the temperature acting on the reactor tube can be accomplished by deflecting the flame zone from the tube. The feed rate can also be increased so that the average temperature experienced by the feedstock before escaping as gases through apertures 54 is lowered.

Figure 4:
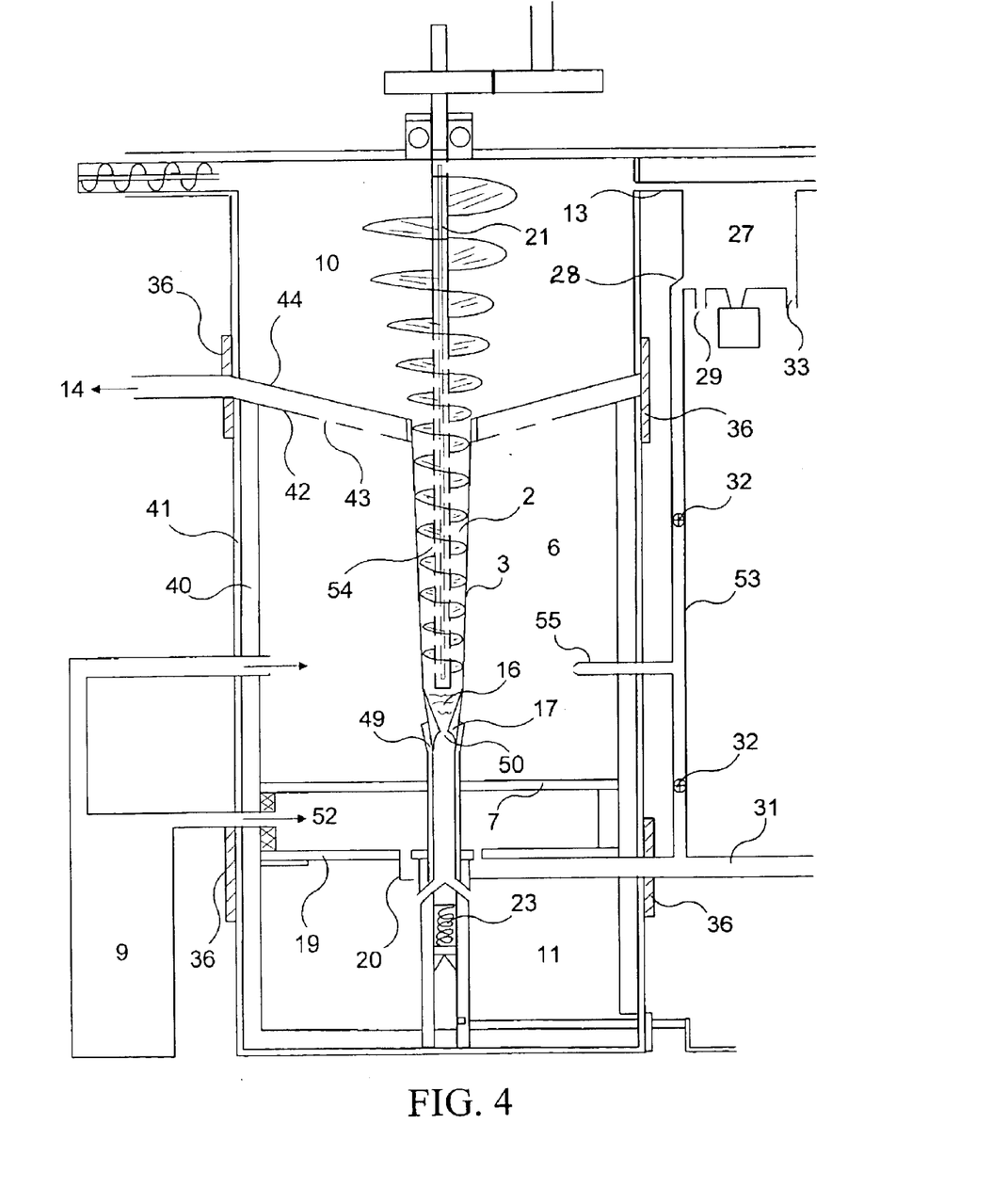
FIG. 4 illustrates a cross-section of a gasifier in accordance with the subject invention, adapted to collect rather than burn, the char-ash.

The basic microgasifier of the subject invention may also be modified or adapted in order to gasify feedstock with toxic contents. An anaerobic (without air) gasifier can lower the formation of volatile metal oxides or otherwise lower the volatilization of metallic constituents in favor of deposition in the char-ash residue. Referring to FIG. 4, an embodiment in accordance with the subject invention which can be used to gasify feedstock with toxic contents is shown. The gasification reactor is anaerobic, which can lower the formation of volatile metallic oxides or otherwise promote metallic deposition in the char-ash. For example, in the embodiment shown in FIG. 4, the change from FIG. 3 is the replacement of the male cone or adjustable or spring loaded cone-like plug 18 by a female hollow tube 49 that extrudes char-ash, for example, through the diagonal orifices at its bottom. The openings of the ring burner-spider 19 are covered to avoid burning the char-ash ladened with toxics. Advantageously, this facilitates the adaption of the gasifier for the disposal of discarded copper chromium arsenate (CCA) treated wood and subsequent reconcentration of the CCA, and/or its constituents. This embodiment can also be useful for the disposal of plant matter used in phytoremediation to capture toxic metals from contaminated sites. The char-ash-tar outlet is modified to feed into a collector for later processing.

The gasifier consists of three major components that can be assembled, for example, with the help of the positioning rings 36 or flanges. The upper assembly is the pressure capable inner hopper and combustion exhaust plenum-outlet. The middle assembly is the combustion. The bottom assembly is the char-ash collector from the ring burner downward.

A means for inputting external solid feed (e.g., coal and/or tire chips) to provide heat of gasification or to enrich the feedstock can also be added to the outer hopper. In addition, an external hopper 15 (see FIG. 1) and system for feeding stored fuel (e.g., coal, tire chips, RDF, heavy oil) directly to the combustion grate can be provided. The feeding of stored fuel directly to the combustion grate can provide gasification energy when, for example, the char-ash is ladened with toxics and, therefore, not burned. In addition, the feeding of solid fuels directly to the combustion grate can be useful when normal feedstock is wet and/or when external gas supplies are limited. Feeding biomass to the gasifier via the outer hopper 8 (see FIG. 1) and coal to the combustion via this external hopper can also have operational advantages when biomass feedstock must be stretched.

In a specific embodiment, a co-utilization system can be implemented in which a high density fuel or energy source such as coal, heavy oil, tire crumb, an electric oven, microwave source, electric tube furnace, nuclear source can provide energy for thermally converting biomass to more valuable gaseous liquid or even solid (e.g., metallurgical charcoal, activated charcoal, etc.) form. This embodiment can have a variety of applications and can be used in a number of ways. In this dual feedstock mode, or even the standard mode, chemicals can be blended with the biomass, for example, in the outer hopper, to neutralize unwanted constituents, or to catalytically promote desirable constituents, in the output gases or liquids. A means for such blending can also be provided. Advantageously, such blending can enhance the utility of the output gas or liquid for energy generation, medical applications, for food process applications or to make solvents, colorants, disinfectants, fumigants or other specialty chemicals.

In addition, a specific embodiment can comprise a means for char-ash glassification. In a specific embodiment, low melting temperature material is added to the feedstock so that the extruded char-ash is melted and forms a glassy char-ash. In an additional embodiment, alkali rich materials such as grasses are included in the feedstock to yield a "wet" char-ash.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A process for pyrolysis of feedstock comprising a substance selected from the group consisting of biomass wood chips, newspaper, mixed waste paper, peat, energy crops, agricultural residues, coal, tire chips, plastics, and RDF, said process comprising the following steps:

supplying the feedstock into an inner hopper;

introducing the feedstock into, and moving said feedstock through a reactor tube, the feedstock being moved through the reactor tube by a rotating auger;

heating the feedstock within said reactor tube to a sufficient temperature such that pyrolysis of the feedstock occurs to produce a residual carbon feedstock;

generating heat within a combustion chamber, wherein the combustion chamber is in direct thermal contact with the reactor tube such that heat generated within the combustion chamber is transferred to the feedstock in the reactor tube through the wall of the reactor tube to provide the heat for pyrolysis; and collecting the residual carbonized feedstock exiting the reactor tube in a pressure vessel;

wherein the feedstock is introduced into the reactor tube from the inner hopper, said reactor tube comprising an exit orifice, the residual carbonized feedstock exiting the reactor tube via the exit orifice and entering the pressure vessel; and wherein the pressure generated in the pressure vessel forces the flow of gasses of pyrolysis upward through the reactor tube and through the incoming feedstock in the inner hopper, such that said feedstock in the inner hopper acts as a filter and heat generated in the combustion chamber is transferred to the incoming feedstock within the hopper.

2. The process for pyrolysis of feedstock in claim 1, further comprising the step of:

injecting a gas into the pressure vessel, the gas being selected from the group coasting of $CO_2$, steam, natural gas, oxygen, and air.

wherein the gas injected into the pressure vessel enhances the conversion of the residual carbonized feedstock exiting the reactor tube via the exit orifice to gasses and/or liquids; and wherein the flow of the gas injected into the pressure vessel is controlled in order to adjust the conversion of the residual carbonized feedstock into the gasses and/or liquids.

3. The process for pyrolysis of feedstock in claim 1, further comprising the step of:

introducing feedstock into, and moving said feedstock through, at least one additional reactor tube; and heating the feedstock within said at least one additional reactor tube to a sufficient temperature such that pyrolysis occurs to produce a residual carbonized feedstock;

wherein the feedstock is introduced into the at least one additional reactor tube from the inner hopper.

4. A process for pyrolysis of feedstock comprising a substance selected from the group consisting of biomass wood chips, newspaper, mixed waste paper, peat, energy crops, agricultural residues, coal, tire chips, plastics, and RDF, the process comprising the following steps:

supplying the feedstock into an inner hopper;

introducing the feedstock into, and moving said feedstock through a reactor tube, the feedstock being moved through the reactor tube by a rotating auger;

heating the feedstock within said reactor tube to a sufficient temperature such that pyrolysis occurs to produce a residual carbonized feedstock; the heat for heating the feedstock being generated by a heat source selected from the group consisting of combustion chamber, gas heat, electric coil oven, and electric tube furnace; and collecting the residual carbonized feedstock exiting the reactor tube in a pressure vessel;

wherein the feedstock is introduced into the reactor tube from the inner hopper, said reactor tube comprising an exit orifice, the residual carbonized feedstock exiting the reactor tube via the exit orifice and entering the pressure vessel; and wherein the pressure generated in the pressure vessel forces the flow of gasses of pyrolysis upward through the reactor tube and through the incoming feedstock in the inner hopper, such that said feedstock in the inner hopper acts as a filter and heat generated by the heat source is transferred to the incoming feedstock within the inner hopper.

5. The process for pyrolysis of feedstock in claim 4, further comprising the step of:

injecting a gas into the pressure vessel, the gas being selected from the group consisting of $CO_2$, steam, natural gas oxygen, and air;

wherein the gas injected into the pressure vessel enhances the conversion of the residual carbonized feedstock exiting the reactor tube via the exit orifice to gases and/or liquids; and wherein the flow of the gas injected into the pressure vessel is controlled in order to adjust the conversion of the residual carbonized feedstock into the gasses and/or liquids.

6. The process for pyrolysis of feedstock in claim 4, further comprising the step of introducing feedstock into, and moving said feedstock through, at least one additional reactor tube; and heating the feedstock within said at least one additional reactor tube to a sufficient temperature such that pyrolysis occurs to produce a residual carbonized feedstock, wherein the feedstock is introduced into the at least one additional reactor tube from the inner hopper.

7. A device for pyrolysis of feedstock, comprising
an inner hopper for supplying a feedstock;
a reactor tube within which pyrolysis of the feedstock occurs;
a means for introducing Feedstock into, and moving the feedstock through, the reactor tube, said means for introducing and moving the feedstock comprising a rotating auger;
a means for heating the feedstock within said reactor tube to a sufficient temperature such that pyrolysis occurs to produce a residual carbonized feedstock, said means for heating comprising a heat source selected from a group consisting of combustion chamber, gas heat, electric coil oven, and electric tube furnace; and
a pressure vessel positioned to collect the residual carbonized feedstock exiting the reactor tube;
wherein the feedstock is introduced into the reactor tube from the inner hopper, said reactor tube comprising tan exit orifice said residual carbonized feedstock exiting the reactor tube via the exit orifice and entering the pressure vessel; and
wherein the pressure generated in the pressure vessel forces the flow of gasses of pyrolysis upward through the reactor tube and through the incoming feedstock in the inner hopper, such that said feedstock in the inner hopper acts as a filter and heat generated by the means for heating is transferred to the incoming feedstock within the inner hopper.

8. The device for pyrolysis of feedstock in claim 7, further comprising
a means for injecting a gas into the pressure vessel;
wherein the means for injecting a gas into the pressure vessel enhances the conversion of the residual carbonizes feedstock existing the reactor tube via the exit orifice to gasses and/or liquids; and
wherein the low of the gas injected into the pressure vessel is controlled in order to adjust the conversion of the residual carbonized feedstock into the gasses and/or liquids.

9. The device for pyrolysis of feedstock in claim 7, further comprising at least one additional reactor tube;
wherein the feedstock within said at least one additional reactor tube is heated to a sufficient temperature such that pyrolysis occurs to produce a residual carbonized feedstock; and
wherein the feedstock is introduced into the at least one additional reactor tube from the inner hopper.

10. A device for pyrolysis of feedstock, comprising:
an inner hopper for supplying a feedstock;
a reactor tube within which pyrolysis of feedstock occurs;
a means for introducing feedstock into, and moving the feedstock through, the reactor tube, said means for introducing and moving the feedstock comprising a rotating auger;
a combustion chamber positioned such that the combustion chamber is in direct thermal contact with the reactor tube such that heat generated within the combustion chamber is transferred to the feedstock in the reactor tube to provide heat of pyrolysis to produce a residual carbonized feedstock; wherein the feedstock is introduced into the reactor tube from an inner hopper, and wherein gasses of pyrolysis travel through the feedstock in the inner hopper such that feedstock in the inner hopper acts as a filter; and
a pressure vessel positioned to collect the residual carbonized feedstock exiting the reactor tube;
wherein the feedstock is introduced Into the reactor tube from the inner hopper, said reactor tube comprising an exit orifice, said residual carbonized feedstock exiting the reactor tube via the exit orifice and entering the pressure vessel; and wherein the pressure generated in the pressure vessel forces the flow of gasses of pyrolysis upward through the reactor tube and through the incoming feedstock in the inner hopper, such that said feedstock in the inner hopper acts as a filter and beat generated by the combustion chamber is transferred to the incoming feedstock within the inner hopper.

11. The device for pyrolysis of feedstock in claim 10, further comprising:

a means for injecting a gas into the pressure vessel;

wherein the means for injecting a gas into the pressure vessel enhances the conversion of the residual carbonized feedstock existing the reactors tube via the exist orifice to gasses and/or liquids; and wherein the flow of the gas injected into the pressure vessel is controlled in order to adjust the conversion of the residual carbonized feedstock into the gasses and/or liquids.

12. The device for pyrolysis of feedstock in claim 10, further comprising at least one additional reactor tube;

wherein the feedstock within said at least one additional reactor tube is heated to a sufficient temperature such that pyrolysis occurs to produce a residual carbonized feedstock; and wherein the feedstock is introduced into the at least one additional reactor tube from the inner hopper.

\* \* \* \* \*